Figure 1A:
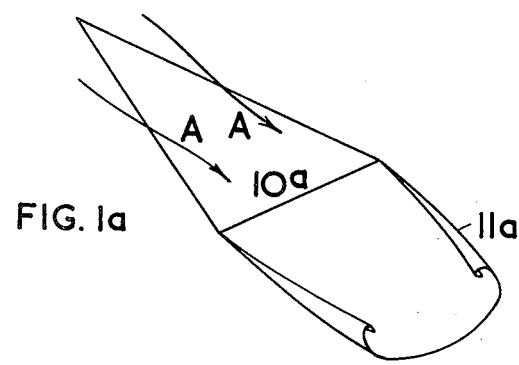

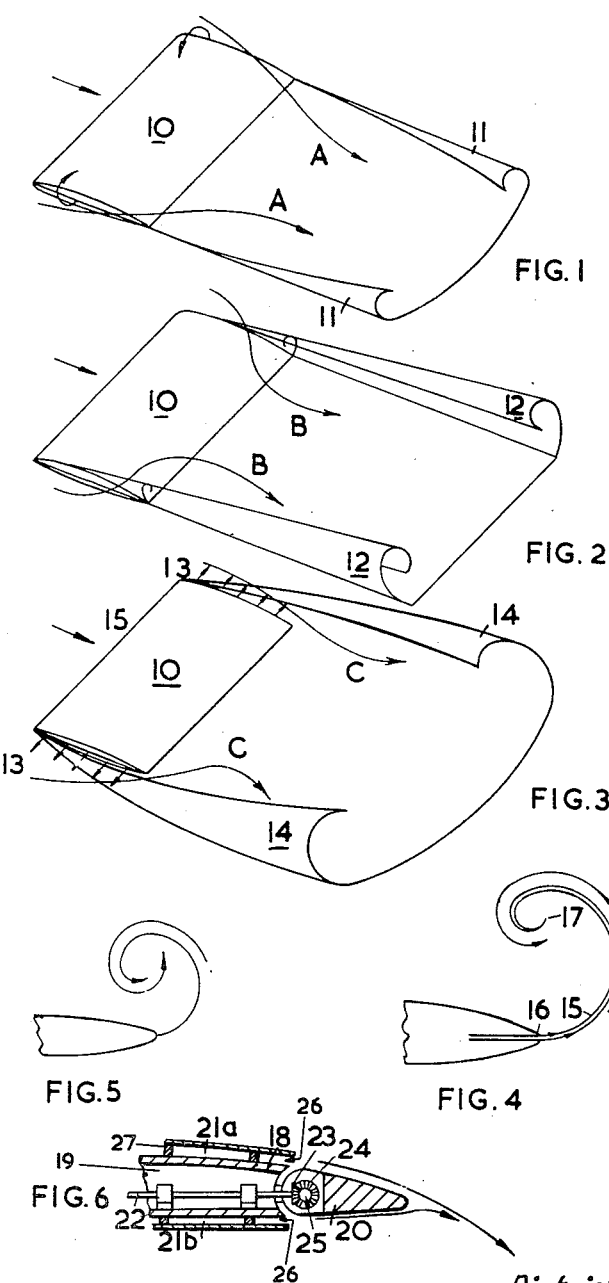
May 21, 1963   D. KUCHEMANN ET AL   3,090,584
AIRCRAFT
Inventors
Dietrich Kuchemann,
Geoffrey M. Lilley & Eric C. Maskell Inventors
Dietrich Kuchemann,
Geoffrey M. Lilley & Eric C. Maskell
By Stevens, Davis, Miller & Mosher
Attorneys

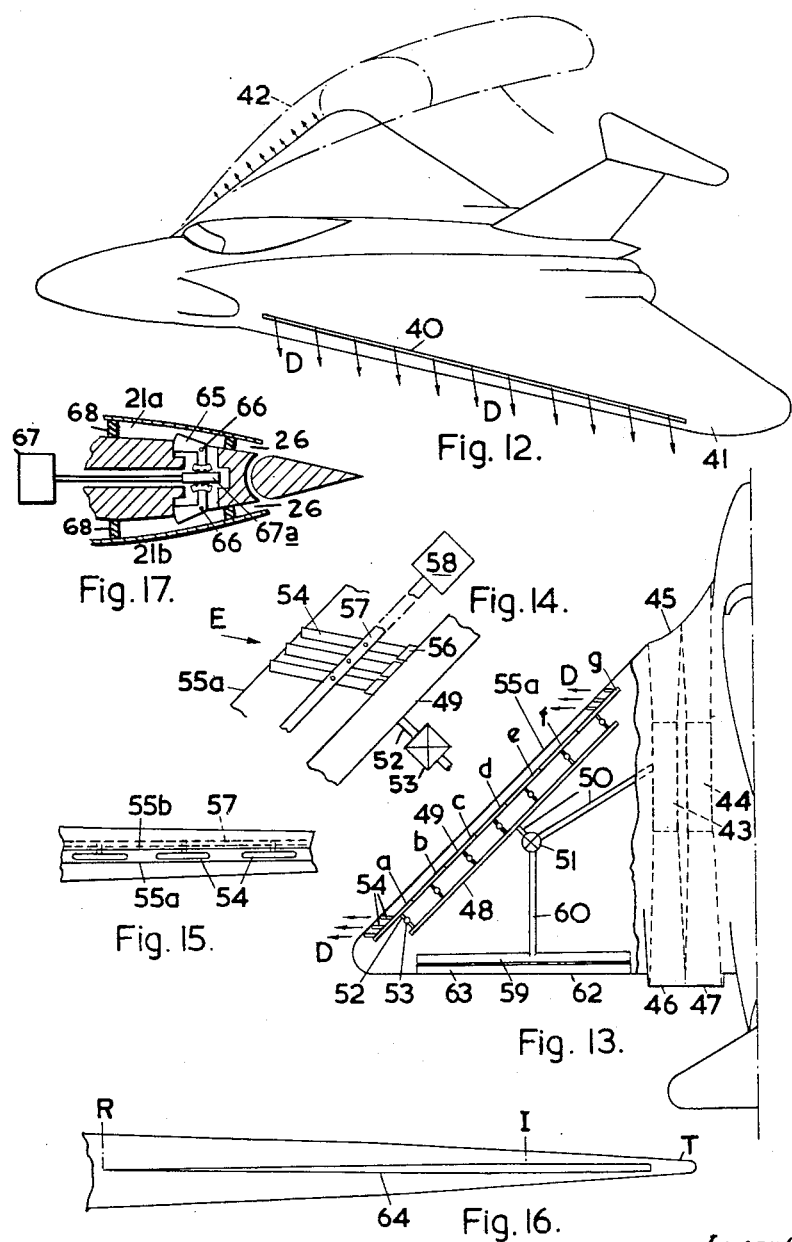

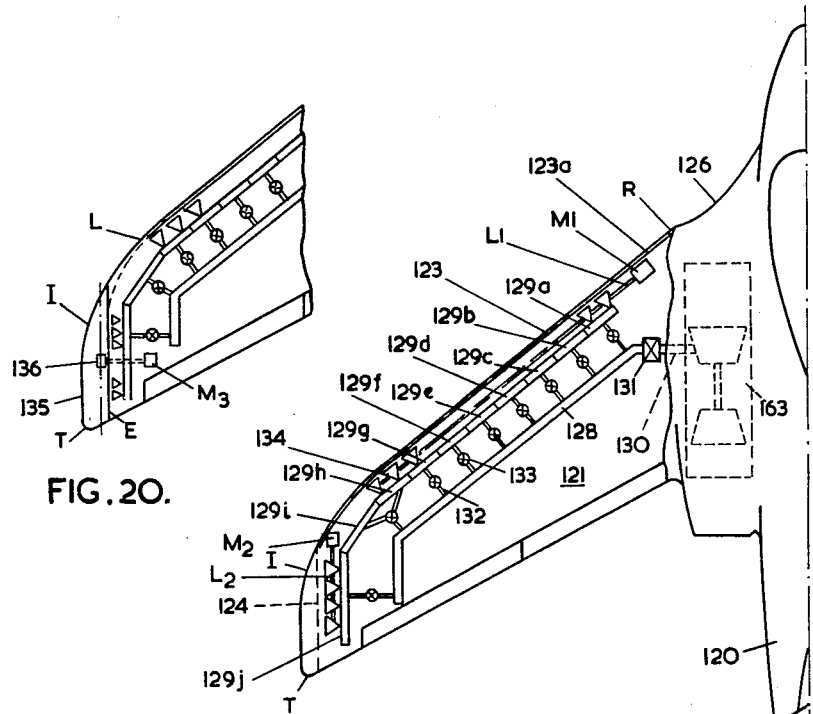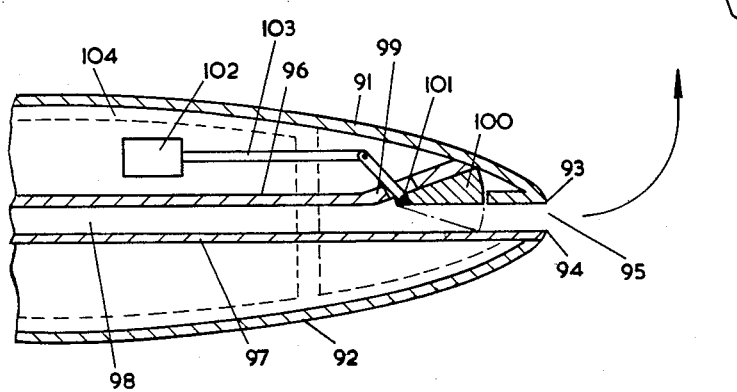

Inventors
Dietrich Kuchemann,
Geoffrey M. Lilley & Eric C. Maskell

By Stevens, Davis, Miller & Mosher
Attorneys

United States Patent Office 3,090,584
Patented May 21, 1963

3,090,584
AIRCRAFT
Dietrich Kuchemann, Farnham, Surrey, Geoffrey Michael Lilley, Bletchley, and Eric Cyril Maskell, Farnborough, England, assignors to Power Jets (Research and Development) Limited, London, England, a British company
Filed Dec. 23, 1959, Ser. No. 861,699
Claims priority, application Great Britain Aug. 15, 1956
11 Claims. (Cl. 244—42)

This invention relates to aircraft, which term is used herein and in the claims which follow to apply to craft adapted for airborne flight with or without wings.

The invention relates more particularly to means for varying the lift and control forces acting on an aircraft, for example, on an aircraft wing and is of especial value when applied to aircraft having sharp-edged swept wings or wings of low aspect ration with swept wing tips but it is not limited to such aircraft.

It is to be understood, of course, that the term "swept" as employed in this specification to describe the whole or part of a particular region of an aerodynamic surface applies to both leading and tip edges of aerodynamic lifting members such as wings and includes such members when the leading and tip edges are continuous with no discernible point at which one may be said to begin and the other to end, and also to the side surfaces of wingless aircraft.

Now the lift characteristics of conventional straight wings or slightly swept back wings of normal aspect ratio conform with what is known as classical linear lifting theory by which it is postulated that lift is derived as a result of the air flow being closely attached to both surfaces of the wing, especially to the upper surface, in particular around the leading edge. Another known characteristic of the air flow over such conventional wings is the presence of a vortex sheet shed from the tip and trailing edge of the wing which begins to roll up at and around the wing tip itself. Similarly, in the case of wings of low-aspect-ratio with highly swept leading edges, the airflow may not be attached over the leading edge, as is commonly assumed, but separated from it thus forming vortex sheets above the wing surface. The presence of the rolled up vortex sheet at the wing tip has not hitherto been thought of importance because it was known that it made only a very limited contribution to the total lift of a typical high-aspect-ratio wing and was originally thought to contribute a relatively small proportion of the lift of a low-aspect-ratio wing, although it is known that in the case of the highly swept low-aspect-ratio wing the lift obtained often exceeds the amount estimated by simple classical linear lifting theory.

It has now been discovered that changes of the aerodynamic characteristics of an aircraft may be obtained by modifying the vortex sheet, and, according to the invention, an aircraft having an aerodynamic surface, other than a trailing surface, which is swept in relation to the normal direction of flight of the aircraft and from which air flowing over said surface is shed therefrom in the form of a vortex sheet in forward flight, comprises lips in said surface in the region thereof from which said vortex sheet is shed said lips defining slot shaped fluid outlet means, and means for ejecting a gaseous jet from the outlet thereby to stimulate the shedding of the vortex sheet.

Thus an aircraft having an aerodynamic lift member with an edge, such as a swept leading edge or tip, from which a vortex sheet is shed in forward flight may comprise lips at the edge defining a slot shaped nozzle extending along the edge of the member.

The jet may be of air or other gaseous fluid such as exhaust gas and may be supplied, for example, from the compressor or turbine of an aircraft's compressor-turbine power plant.

The jet is advantageously discharged in the form of a thin jet sheet from one or more apertures in the form of nozzles or slots and may be directed in any desired direction and may extend along the whole or part of the edge.

The strength of the jet may be variable over the length of the edge from which it is discharged: it may be relatively stronger or weaker in particular zones or vary uniformly in strength from end to end. For this purpose, the pressure of the jet may be adjusted, or alternatively the slot or the nozzles may be made variable in area so that the discharge velocity remains constant while the jet sheet is made thinner, or again the apertures may be of fixed area but be graded uniformly from end to end of the wing.

The apertures may be shaped so that the jet is curved about an axis parallel to the direction of flow of the gas immediately on discharge from the nozzle.

In applying the invention to increase wing lift without excessive drag it will normally be desirable to arrange that the strength of the jet increases uniformly rearwardly from zero at the most forward discharge point so as to maintain a continuous vortex sheet which rolls up into a single core, for which purpose, in the case of discharge of a jet from a straight edge, a linear increase in jet strength is desirable over at least the forward and major portion of the edge. In the particular case of a jet blown from the swept back straight leading edge of a delta wing the extent of the major portion over which the linear increase in strength should occur should itself increase with increase in the leading edge sweep back angle, thus tending to extend over the whole edge as the angle approaches 90° and the aspect ratio of the wing tends to zero.

In the case of a swept back rectangular wing the jet may be discharged from apertures in the wing tip, which has, in effect, 90° sweep back. In extreme cases the wing may be of negligible proportions in relation to the body to which it is attached, and in the ultimate case the wing may be non-existent, the lift being provided exclusively by jets discharged from apertures in the surface of the body so as to stimulate, enlarge and strengthen the vortices shed by the body, as in the case of a wing, in accordance with the invention.

The apertures from which the jet is discharged and the pressure of the jet must be such that it flows clear of the wing or body surface so as to obviate any attachment of the air flow along the desired line of separation of the flow from the wing surface, this being essential to ensure that the vortex sheet is stimulated, enlarged and strengthened by the action of the jet. The aperture should have a sharp edged rim so as to help ensure the desired flow of the jet.

The apertures may be movable and, in addition, or as an alternative, to blowing from such a movable aperture situated at, or very close to, the wing leading edge or tip at which a change of characteristic of the vortex sheet is to be brought about, this edge or tip may be equipped with a small pivoted flap and an aperture on the wing, the jet being blown in the form of a thin sheet initially tangentially to and in contact with the wing at a velocity sufficient to carry it over the wing and flap and then clear of the flap still in the form of a thin sheet, the flap being adjustable to vary the direction of the jet leaving its free edge.

The invention also extends to a combination of blowing a jet from a swept leading edge or tip as above described and blowing a jet sheet in the known manner from the trailing edge. The combination may be adjusted so that a finite load can be sustained at the trailing edge, which normally can sustain no finite load, as well as at the leading edge or tip.

As regards the lateral control of an aircraft, it is to be noted that by varying the lift on the wings differentially, a variable lateral control force is readily obtained.

Figure 2A:
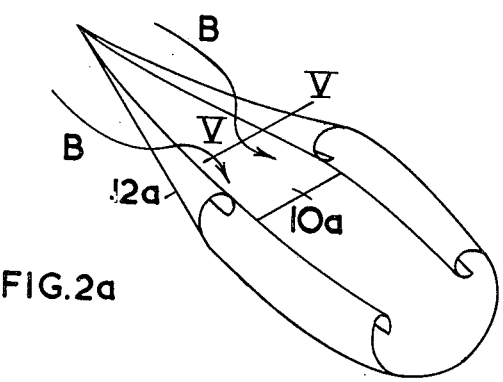
Figures 3A, 3B:
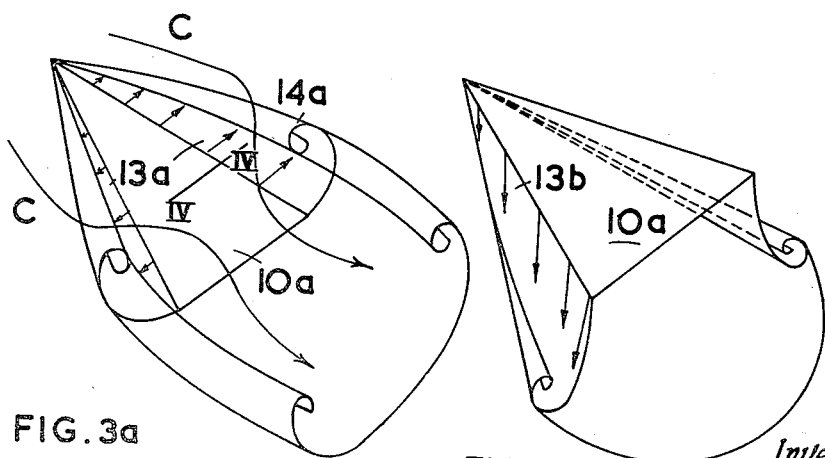
Figure 7:
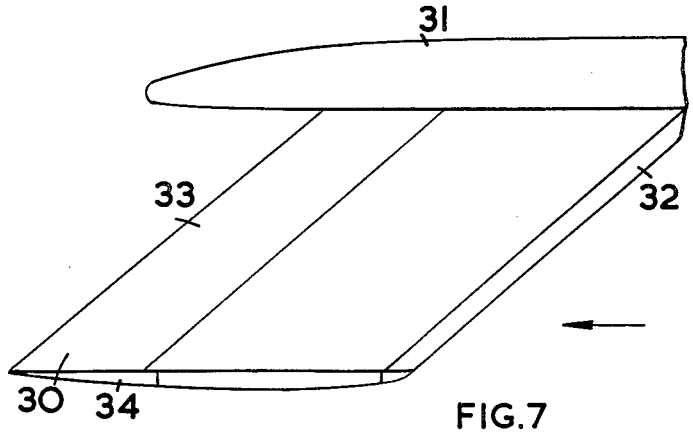
Figure 8:
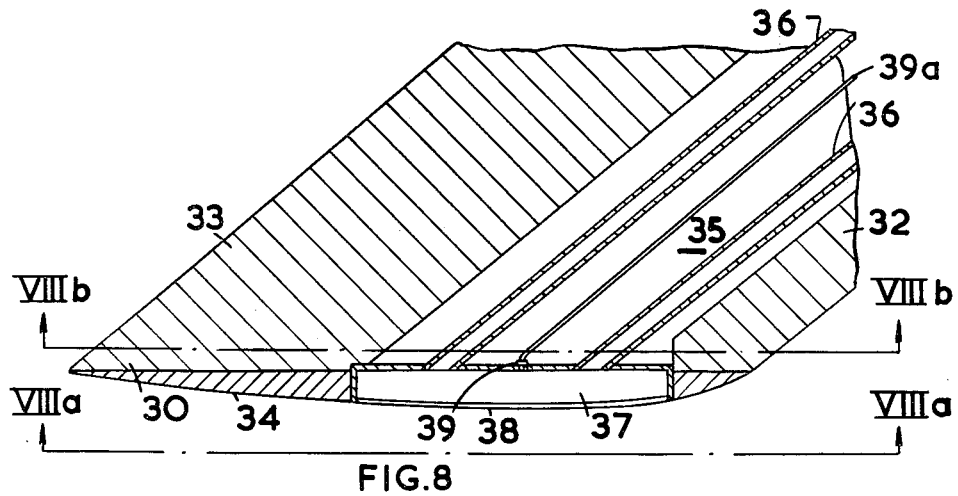
Figure 8A:
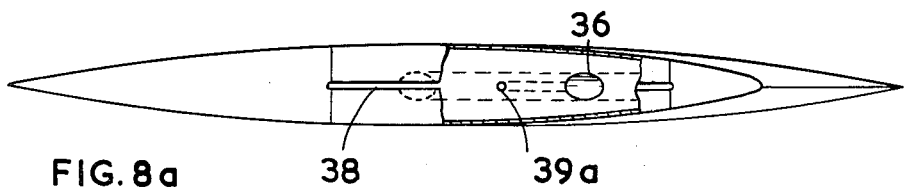
Figure 8B:
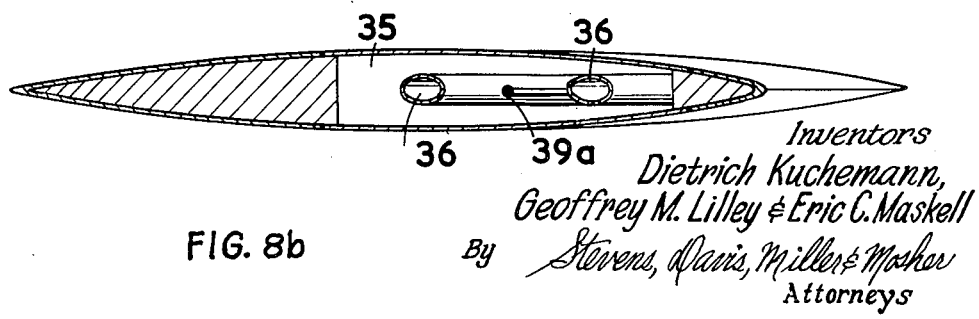
Figure 9:
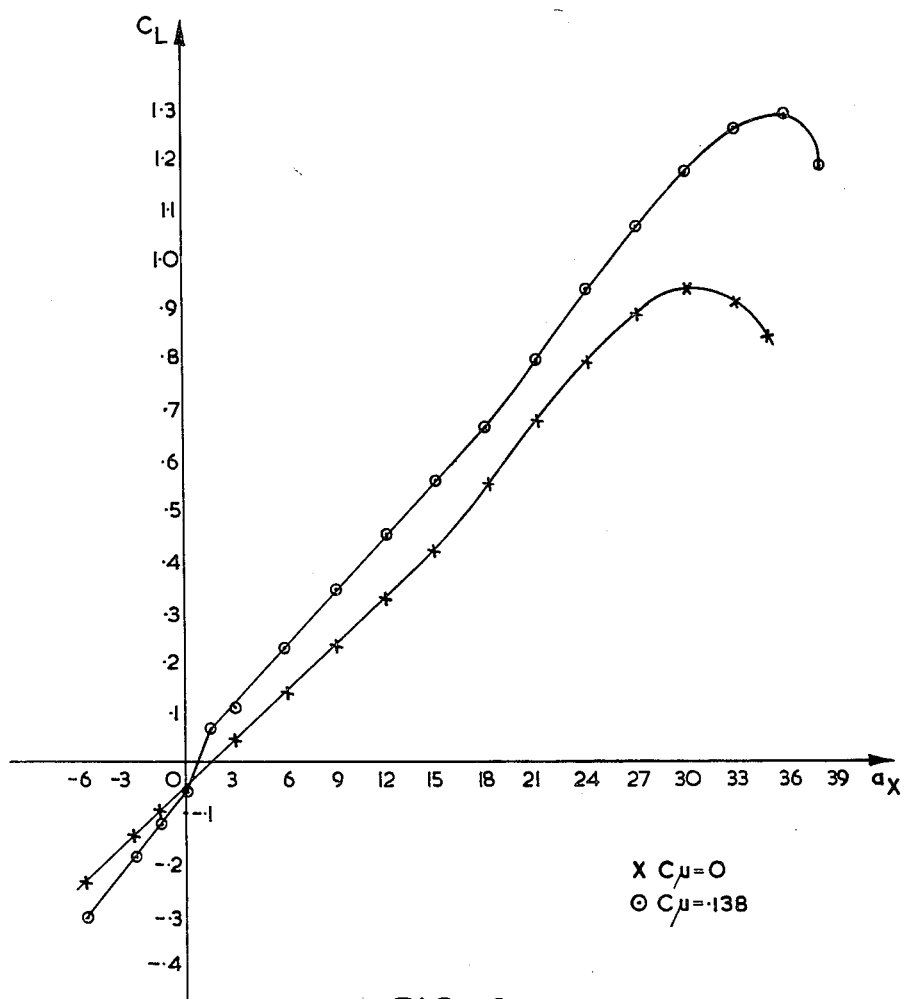
Figure 10:
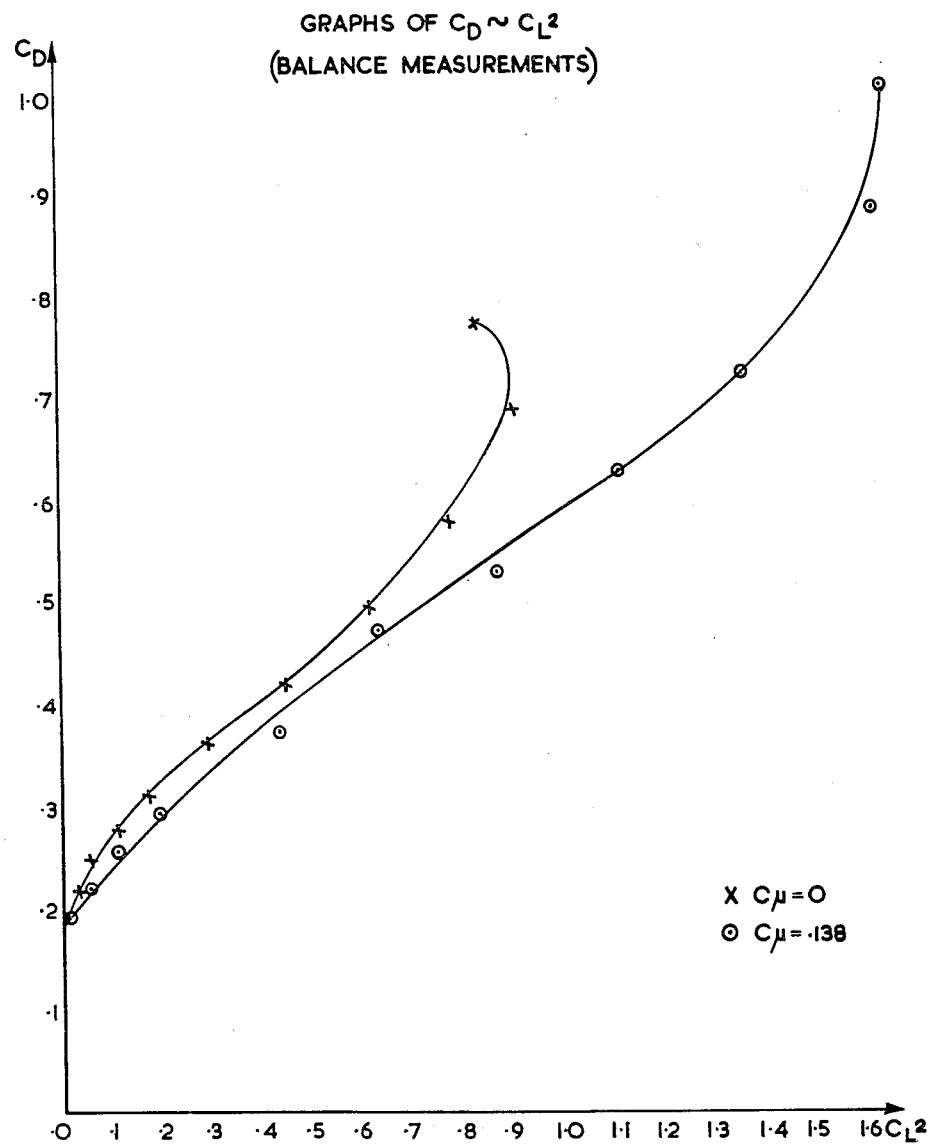
Figure 11:
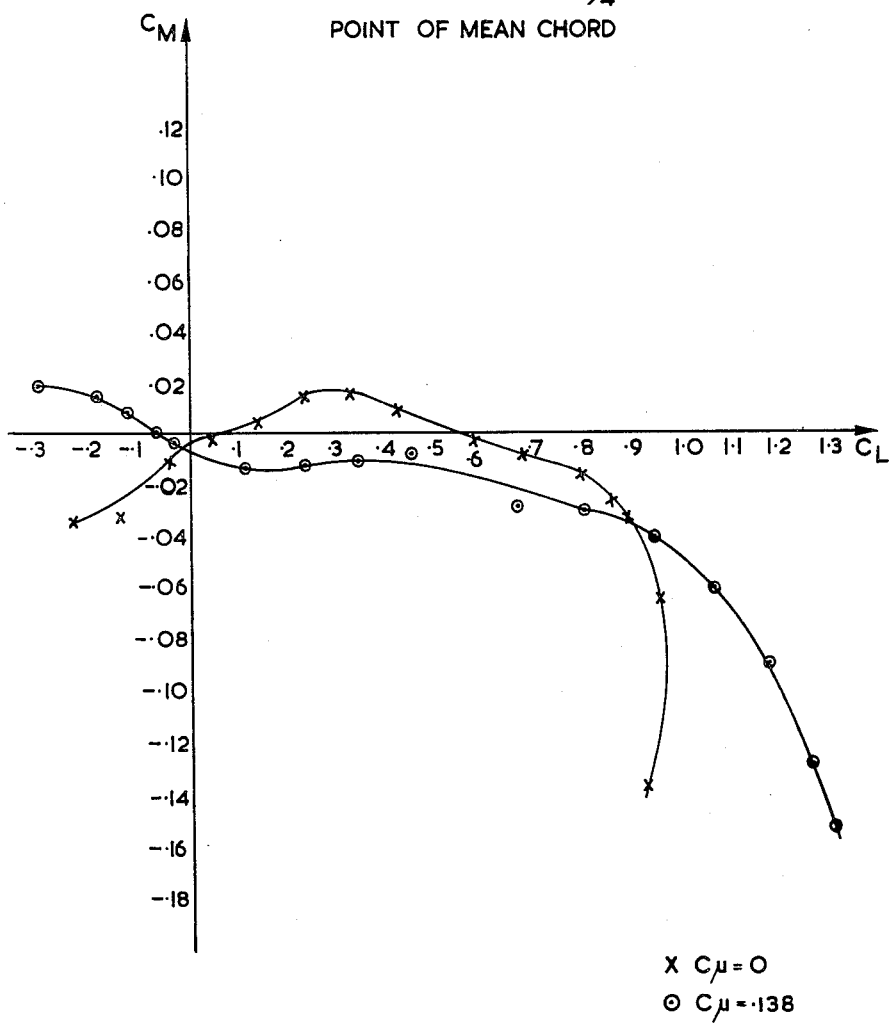
Figure 18:
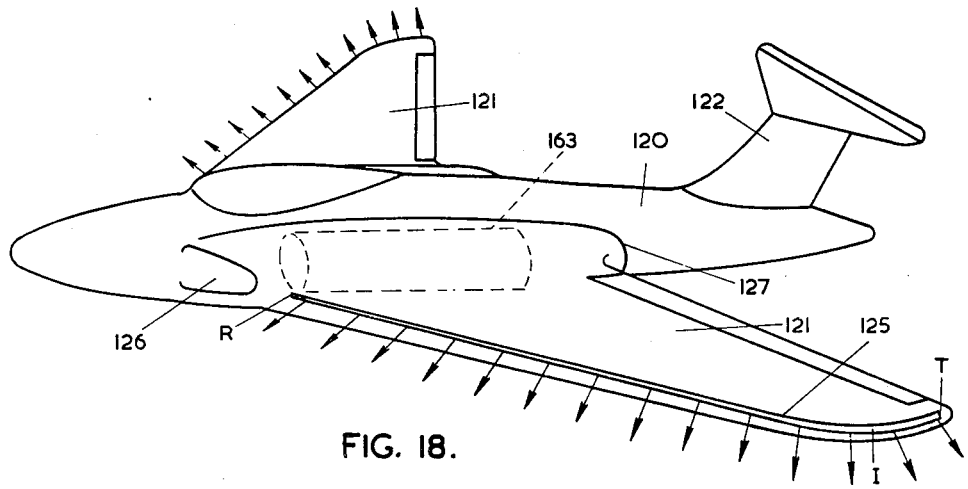
Figure 21:
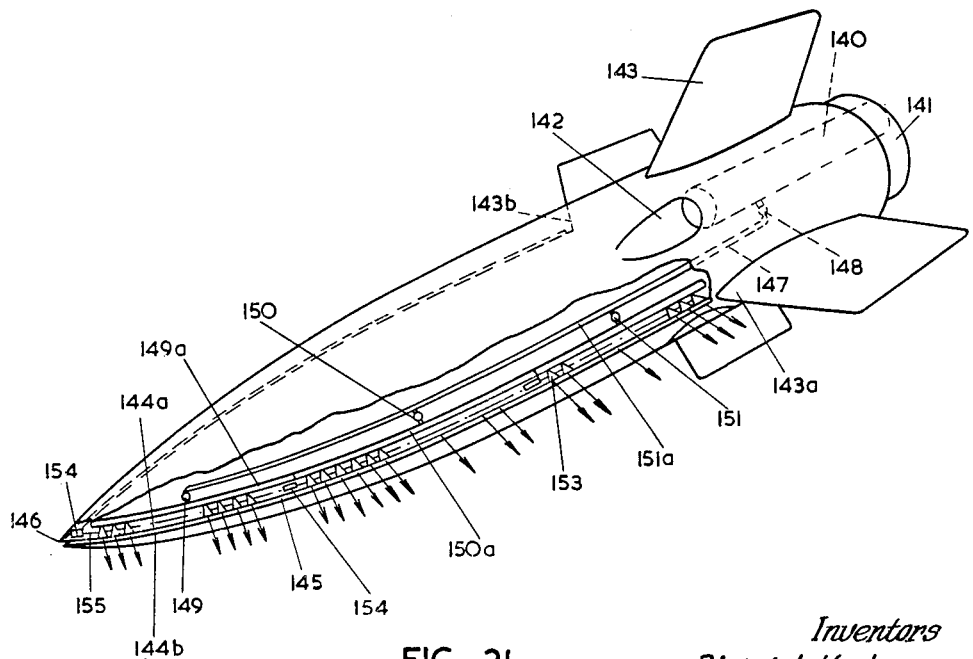

The invention will now be described with reference to the accompanying drawings of which:

FIGURES 1, 2 and 3 illustrate in perspective wings of rectangular plan form and FIGURES 1a, 2a, 3a, and 3b illustrate in perspective wings of swept back or delta plan form, somewhat similar aerodynamic conditions obtaining as regard figures of the same reference number, FIGURES 4 and 5 show the sectional shape of vortices at the lines IV—IV and V—V of FIGURES 3a and 2a respectively, FIGURE 6 shows in cross section the hinged flap method of directing the jet sheet, FIGURES 7, 8, 8a and 8b show a model wing equipped according to the invention, FIGURES 9, 10 and 11 illustrate typical results achieved in the wind tunnel testing of the model of FIGURES 7 and 8, FIGURES 12, 13, 14 and 15 illustrate diagrammatically details of a method of applying the invention to a delta wing aircraft, FIGURE 16 illustrates diagrammatically one form of slot in the leading edge of wing, FIGURE 17 illustrates one method of controlling the strength of the jet, FIGURE 17a illustrates another application of the apparatus of FIGURE 17, FIGURES 18 and 19 are perspective and plan views respectively of part of a swept wing aircraft, FIGURE 19 showing the wing with the upper skin removed, FIGURE 20 is a plan view of part of a wing alternative to that of FIGURE 19, also with the upper skin removed and FIGURE 21 is a perspective view of a wingless aircraft embodying the invention.

FIGURES 1 and 1a show diagrammatically, conventional wings 10, 10a, subject to assumed normal flow conditions without blowing according to the invention. In the case of FIGURE 1a, the assumed flow is seldom possible in practice. The tip or leading edge vortices at 11, 11a are very small and have substantially no height at the tip or edge and are shed rearwardly approximately in line with the tip, some air being induced to flow over the wing and being partly entrained by the vortices as shown by the arrows "A." The trailing vortex sheet is thus essentially flat near the wings and originates from the trailing edge only.

FIGURES 2 and 2a show the wings 10, 10a, of FIGURES 1 and 1a under conditions in which separation of the flow along the tip or leading edges occurs but still without blowing according to the invention. In this case the tip vortices 12, 12a are much larger than in the case of FIGURES 1 and 1a and have positive height in the region of the tip of leading edge so that an appreciably increased volume of air is induced to flow over the vortex sheets, as indicated by arrows "B," whereby extra lift is developed in proportion to the additional work done on the larger volume of air influenced by the wing and the tip or leading edge vortices together.

FIGURES 3 and 3a show the wings 10, 10a of FIGURES 1 and 1a in which the air flow at the tip or leading edge is influenced according to the invention by a spanwise jet sheet 13, 13a, whereby the tip or leading edge vortex sheets 14, 14a are considerably increased in strength both spanwise and in vertical height, having an effect analogous to increasing the aspect ratio of the wing and thus considerably increasing the work done by the wing on air flowing over it and entrained by the enlarged vortices (arrow "C") shed by the wing tip or leading edge, so increasing the total lift of the wing. It is important to note that as the geometric aspect ratio of the wing becomes less, the importance of the tip vortices increase.

FIGURE 3b shows the wing 10a of FIGURE 3a in which the vortex sheets are deflected downwards by appropriately downwardly directed jets 13b whereby large lift forces may be obtained, for example in take off conditions, at even a low forward speed, in addition to the contribution of direct lift from reaction in the downwardly directed nozzle from which the jets issue.

The changes in lift obtained by blowing at the tip, as shown in FIGURES 2 and 3, and at the leading edge, as shown in FIGURES 2a, 3a and 3b, may be further varied by changing the direction in which the jet is blown. In most cases a rearward component of jet direction is desirable.

FIGURE 4 shows in cross section how a jet sheet 15 blown according to the invention, spanwise from the leading edge 16 of a highly swept back wing stimulates, enlarges and strengthens the shape and strength of the vortex 17 at the edge, compared with the vortex shed by the edge without blowing, as in FIGURE 5.

In FIGURE 6 the leading edge 18 of the wing 19 comprises a hinged flap 20 and upper and lower skin members 21a, 21b forming part of the wing surfaces, and defining slot shaped nozzles 26, the thin jet sheet being directed by one of the nozzles to flow in close contact with and over the flap, which may be moved to vary the direction of the jet sheet leaving the flap. The means for moving the flap comprise a driven rotary shaft 22 and co-operating gears 23 and 24, the former being fast on the shaft 22 and the latter on the flap pivot 25. Parts of conventional rib members are shown as at 27: these serve to locate the skins but as they are spaced apart spanwise, they do not seriously interfere with the gas flow.

FIGURE 7 is a plan view of a model wing and FIGURE 8 a sectional view of the wing of FIGURE 7 showing the general arrangements of the components. FIGURES 8a and 8b are sectional views in the direction of the arrows VIIIa and VIIIb of FIGURE 8. The model is more precisely a half wing 30 mounted on a reflection plate 31, and having parallel leading and trailing edges 32, 33 respectively with 50° sweep back and a substantially straight tip 34, the tip edge having an effective average sweep back of 90°. The thickness chord ratio of the wing in the spanwise direction is 0.077.

The wing comprises a spanwise hollow chamber 35 through which pass ducts 36 for air under pressure, being connected to a settling chamber 37 forming part of the tip of the wing. The remainder of the wing tip is made up so that the whole presents a smooth continuous surface.

The settling chamber 37 has a straight fore and aft slot 38 at the outermost edge of very small width in relation to the dimensions of the wing from which a jet sheet is discharged. In the model shown the width of the slot is 0.005" and its length 10.5", extending aft from 11.7% to 56.4% of the tip chord. A pressure tapping 39 between the supply pipes within the settling chamber 37 by way of the pipe 39a permits measurement of static pressure. Numerous small diameter pressure tubes (not shown) are let into the surface of the wing at various spanwise stations and led away through the reflection plate 31 (to prevent them from interfering with the air flow near the model) and are connected to a manometer for comparison with the tunnel static pressure whereby the total head can be recorded and compared directly with static pressure on the wing surface.

Tests were carried out at a wind tunnel air speed of 110 ft./sec. both with and without blowing from the tip slot 28, the wing being arranged at various angles of attack within a given range from minus 6° to beyond the positive stall angle. The pressure of air supplied to the slot was varied, the maximum being such that the blowing coefficient $C\mu$, which may be expressed as $$C\mu = \frac{MV}{\tfrac{1}{2}pU^2S}$$

was about 0.138 where M is the total mass flow from the slot, V the blowing jet velocity (assuming isentropic flow to free stream pressure), $p$ the free stream density of the air (free stream condition), U the free stream velocity of the tunnel air and S the wing area. Without blowing $C\mu=0$. Tests were carried out for values of $C\mu$ between 0 and 0.138.

The results obtained from the wind tunnel tests, which are not corrected for wind tunnel interference and tare effects, may be summarised as follows:

Table I

|  | $C\mu=0$ | $C\mu=0.138$ |
|---|---|---|
| Maximum lift coefficient $C_L$ max | 0.94 | 1.28 |
| Lift curve slope $\left(\frac{dC_L}{da}\right) c_{L}=0.1$ | 1.78 | 2.12 |
| Lift curve slope $\left(\frac{dC_L}{da}\right) c_{L}=0.7$ | 2.29 | 2.60 |
| Geometric incidence $a_{(C_L max.)}$ | 30.3° | 36.0° |
| Aerodynamic centre position measured from the local leading edge. $\{h_{L}=0}$ | .136 | .328 |
| $\{h_{(C_L=0.7)}$ | .314 | .319 |
| Drag coefficient (L=0) $C_{D0}$ | .190 | .180 |

The increase in $C_L$, the lift coefficient, and the reduction of drag at a given $C_L$, due to the invention, are shown in FIGURES 9 and 10 respectively. The reduction of drag has considerable importance, particularly at large angles of attack where the reduction of drag is greatest.

The effect of the invention on the pitching moment and the movement of the aerodynamic centre of the wing is illustrated in FIGURE 11 from which it will be seen that for $C\mu=0$, the aerodynamic centre of the wing is well forward ($h=0.14$). As the angle of attack is increased, and $C_L$ approaches 0.3, the aerodynamic centre moves downstream, and at $C_L=0.7$, $h=0.31$. The shape of $C_m:C_L$ curve is characteristic of the low-aspect-ratio, highly swept type of rectangular wing planform under consideration.

It is clear that, at $C\mu=0.138$ approximately, the movement of the aerodynamic centre is much smaller than for the wing without blowing from the tip slot. The centre of pressure of the wing with blowing is also further aft than for the wing without blowing for most of the $C_L$ range.

The major effect of blowing the jet sheet from the tip slot on the pressure distribution on the model wing surfaces is to produce numerically larger values of the pressure coefficient on both the upper and lower wing surfaces at all angles of attack. The lower wing surface is, however, less affected. In general the isobars on the upper wing surface in the "with blowing" case tend to be slightly straighter and more nearly parallel to the wing leading edge than in the "no blowing" case.

Another feature of the model wing under consideration is that for angles of attack up to about 15° the spanwise lift distribution is almost constant across the span which indicates that a pressure difference is maintained across the tip jet sheet.

It appears also that the tip jet sheet delays the tip stall by stimulating the formation of the spiral tip vortex sheets and maintains the lift across the whole span for a longer period. It is interesting to note that the increase of lift due to the tip jet sheet is maintained even after the wing has stalled.

FIGURE 12 is a diagrammatic perspective view of a delta wing aircraft having a continuous parallel sided slot 40 along substantially the whole of the swept back leading edge 41 from which a jet sheet 42 is blown as indicated by the arrows D in accordance with the invention.

FIGURE 13 is a diagrammatic plan view of part of the aircraft of FIGURE 12 with part of the upper wing skin removed. The aircraft includes two jet propulsion compressor-turbine power plants 43, 44 which are fed with air from intake 45 and discharge their propulsive jets through tail pipes 46 and 47. The leading edge region of the wing shown comprises two manifolds 48 and 49 of which the former is connected via duct 50 and valve 51 to the compressor of the power plant whilst the latter is divided into seven separate compartments 49a, b, c, d, e, f, g, each of which is connected by an inlet duct as at 52 and valve as at 53 to the manifold 48 and has a plurality of outlets in the form of the flattened tubular nozzles 54. The nozzles 54 terminate within the lips of the slot 40, the lower lip being indicated at 55a. FIGURE 14 shows details of one arrangement of the apparatus of FIGURE 13 whereby the direction of the nozzles 54 may be changed. To this end each nozzle is flexibly connected by an air seal 56 to the manifold 49 and pivotally connected to an arm 57 movable axially by the mechanism 58 in response to control signals.

FIGURE 15 is an end view of the nozzles of FIGURE 14 in the direction of the arrow E, the lips of the slot being indicated at 55a and 55b.

In operation, air under presure is bled from the compressor of the power plant and fed to the manifolds 48 and 49, then to the nozzles 54, the mass effect of the flow from all the tubes being that the air is blown in the form of an initially flat sheet. The direction of the air flow constituting the jet sheet may be changed by operating the operating the mechanism 58 and the strength of the jet may be varied from end to end of the slot by control of the valves 53.

Referring again to FIGURE 13 the wing shown also comprises means for blowing a jet sheet from the trailing edge in the known manner, the means comprising a further manifold 59 also connected via duct 60 and valve 51 to the compressor of the power plant. The manifold forms part of the trailing edge 62 and has a rearwardly facing slot and adjacent movable flap 63 over which a jet sheet blown from the rearwardly facing slot is discharged in the known manner.

FIGURE 16 shows a slot 64 defining discharge outlet means in the leading edge of a wing, the slot increasing in width uniformly from the region R which would normally be adjacent the root part of the leading edge of a wing, to an intermediate point I and then continues at a constant width to the most rearward point T normally adjacent the tip of the leading edge. The portion between R and I provides a substantially linear increase in jet strength uniformly from zero at point R to a maximum at point I, the portion between points I and T being of constant strength over its length.

FIGURE 17 shows in cross section a modification of FIGURE 6 in which throttle valves in the form of segmental cross section obturating members 65 are pivoted about pivots 66 substantially parallel to the edge slot of the nozzles 26 defined at the extremities of the skins 21a and 21b with motor 67 and gear drive means 67a for rotating the obturating members to vary the cross sectional area of the nozzles and hence the strength of the jet. This arrangement permits the velocity of the jet to remain high even though the volume of gas ejected is reduced. Parts of the usual rib members are shown as at 68: these locate the skins but as they are spaced apart they do not interfere with the gas flow.

FIGURE 17a shows in cross section an arrangement similar to that of FIGURE 17 applied to the throttling of a discharge slot in an edge of an aerofoil. In the figure, the upper and lower skins of the aerofoil are shown at 91 and 92 and these define the lips 93, 94 of a slot 95 in the edge of the aerofoil. Between the skins are parallel wall members 96, 97 which define between them a passage 98 for gas passing to the slot. The upper wall is cranked as shown at 99 to meet the upper skin to form with it a housing for a segmental obturating member 100 pivoted at 101 for rotational movement between the position shown and that indicated by the broken lines to vary the width of the slot. A motor 102 and pivoted link mechanism 103 are provided for rotating the obturating members. A typical chord-wise rib member is shown is shown in outline in dotted lines at 104; such members are spaced apart spanwise of the aerofoil and may pass through the passage 98 without seriously affecting the flow of gas. The arrangement described permits throttling the gas flow whilst the velocity of the gas ejected from the slot may be maintained at a high level.

In FIGURES 18 and 19 the aircraft illustrated has a body portion 120, wings 121 and tail plane assembly 122. A compressor-gas turbine jet propulsion power plant 123 is housed in the root of each wing 121.

The wings 121 comprise a continuous leading portion 123 extending from the wing root R to the wing tip T having effective leading and tip edges which merge smoothly together in an intermediate region I. The leading portion has a very narrow slot 125 extending from the root R to the tip T following closely the leading edge (except where indicated by the dotted line in FIGURE 19). The slot 125 increases gradually in width from the root R to the intermediate region I and is of constant width from the region I to the tip T. The slot is not drawn to scale in order that it may be illustrated in the drawing.

Each power plant draws its air through an intake as at 126 and discharges the propulsive jet from a tail pipe as at 127.

The wing houses two manifolds 128 and 129 of which the former is connected via duct 130 and valve 131 to the compressor of the power plant whilst the latter is divided into ten compartments 129, $a$, $b$, $c$, $d$, $e$, $f$, $g$, $h$, $i$ and $j$ each of which is connected by a supply duct as at 132, including a valve as at 133, to the manifold 128. Each of the compartments of manifold 129 has a plurality of outlets in the form of the divergent flattened tubular nozzles as at 134 which are positioned close to one another and together span the full length of the slot 125. These nozzles terminate at the lips of the slot 125, the lower lip being shown as the edge 123a in the region from the root R to the intermediate region I and by the dotted line 124 from I to the tip T. The nozzles are mounted for lateral movement as in the case of the nozzles 54 of the aircraft and apparatus of FIGURES 13 and 14, the movement being controlled by motors M, and $M_2$ and linkages $L_1$ and $L_2$.

Air from the compressor is directed as desired via the duct 130, valve 131, manifolds 128 and 129, ducts 132, valves 133 to the various nozzles whereby a jet sheet may be blown laterally from the slot as shown by the arrows to stimulate the shedding of the vortex sheet from the leading and tip edges.

The wing of FIGURE 20 alternative to that of FIGURE 19 comprises a hinged flap 135 of which the edge extends over part of the leading edge of the wing (from R to I) and the whole of the tip edge (from I to T), being actuated by a motor $M_3$ and gear mechanism 136. The lower lip of the slot 125 follows the leading edge from R to the point L and then the dotted line to coincide with the inner edge E of the flap 135. The nozzles are mounted in the same manner as those of FIGURE 19 and also so that gas blown from those adjacent the flap 135 flows over the upper surface of the flap, whereby the direction of this portion of the jet sheet discharged from the full array of nozzles extending the full span of the slot may be varied in the up or down sense relative to the wing by movement of the flap by means of the motor $M_3$.

Thus the strength and lateral direction of the jet sheet may be varied by the valves 131 and 133 and the nozzles 134, and, additionally, if a hinged flap is fitted, the portion of the jet flowing over it may be directed up and down as desired.

FIGURE 21 shows a wingless aircraft in the form of a body of revolution propelled by jet propulsion means. Part of the skin is broken away for the purposes of illustration. A circular array of jet engines is housed at the rear of the craft, one engine being shown in broken lines at 140, the tail jet pipes protruding within a shroud 141. Air intakes for the engines are provided as at 142. Roll stabilising fins 143 are also fitted to the rear of the craft at 90° stations, being movable for this purpose. Along both sides of the length of the body of the craft, on a diametral plane passing through a pair of fins, the skin is formed with lips 144a and b defining a slot shaped orifice 145 extending from the nose 146 of the craft to the root 143a and b of the opposed fins. Within the craft, duct means as at 147 and valve means as at 148 are provided for tapping working fluid from one or more of the jet engines, the duct being connected at three points via valves 149, 150, 151 to three compartments 149a, 150a, 151a of a manifold 152 extending the length of the slot 145. Connected to the manifold are divergent tubular nozzles as at 153 terminating within the lips and mounted for lateral movement by motors 154 and associated link mechanisms 155 in the plane of the slot.

In flight, working fluid is tapped from the jet engines and directed from the slot 145 via the duct, valve, manifold and nozzle system in the form of a jet sheet, thereby to stimulate the vortex shed by the body and augment the lift.

It is believed that equipping aircraft with jet sheets at the swept leading surfaces, such as swept wing edges or tips according to the invention will result in (1) landing speeds of aircraft being reduced due to a reduction of stalling speed, (2) improved lateral control of aircraft being obtained, especially at low speeds and (3) relatively high values of the lift coefficient of the wings being maintained over a relatively wide range of given conditions. Furthermore, in some cases a jet sheet in accordance with the invention may possibly be substituted entirely for conventional ailerons and moving pitch control surfaces, or in the case of aircraft having wings of very low aspect ratio, or "delta" aircraft without a horizontal tailplane, to augment the otherwise inherently low pitching movement of the aircraft by varying the position of the wing centre of pressure and aerodynamic centre and thus improve longitudinal stability.

It is to be understood that the term "swept wing" includes swept back and swept forward wings and that the invention may be applied to the blades of a helicopter rotor in a similar manner to a non-rotary aircraft wing.

This application is a continuation-in-part application of prior application, Serial Number 675,889, filed August 2, 1957 by the same applicants and now abandoned.

We claim:

1. An aircraft having an aerodynamic lift member with a leading portion including leading and tip edges which is swept in relation to the normal direction of flight of the aircraft and from which in a given region air flowing over said leading portion is shed therefrom as a vortex sheet in forward flight, and comprising lips in, and extending along, at least part of one of said edges to define in said region slot shaped fluid discharge outlet means, and a combination of co-operating members including nozzles for ejecting a powerful gaseous jet from the discharge means, and means for moving the nozzles to adjust the direction in which the jet is blown, the discharge means and the combination of members being so disposed in relation to the "in flight" vortex sheet as to direct the ejected gaseous jet to stimulate the shedding of and enlarge and strengthen the vortex sheet.

2. An aircraft as claimed in claim 1 in which said combination of cooperating members comprises a plurality of separate small nozzles disposed side by side in said slot shaped discharge outlet means to function conjointly to provide a substantially continuous jet extending over the length of the slot.

3. An aircraft as claimed in claim 1 in which the slot shaped discharge outlet means has non-uniform transverse dimensions over at least part of its length whereby the jet strength varies in accordance with the transverse dimension over the length of the nozzle.

4. An aircraft as claimed in claim 3 in which the combination of cooperating members comprises a plurality of separate small nozzles each having a cross sectional area in accordance with the desired local jet strength.

5. An aircraft as claimed in claim 1 in which the slot shaped discharge outlet means defined by the lips is of fixed area but is tapered to increase in width gradually and uniformly from a minimum at a forward point to maximum at a rearward point of the lift member in relation to the normal direction of flight of the wing.

6. An aircraft as claimed in claim 5 in which the slot shaped discharge outlet means comprises a plurality of separate small nozzles disposed to function conjointly to provide a substantially continuous jet extending along the length of the slot.

7. An aircraft as claimed in claim 6 comprising means for supporting the nozzles for movement relative to the lips, and means for moving the nozzles to adjust the direction in which the jet is blown.

8. An aircraft as claimed in claim 7 comprising a movable flap located adjacent the discharge outlet means so that the jet is blown over the flap to leave the free edge as a thin jet sheet extending along the span of the flap, and means for moving the flap to adjust the direction of discharge of the jet leaving the free edge.

9. An aircraft as claimed in claim 8 comprising means affording a flow path for jet gas flowing from the discharge outlet means, and adjustable valve means in the flow path of said gases for varying the flow of the gas and hence the strength of the jet.

10. An aircraft as claimed in claim 9 comprising power plant constituting the means for propulsion of the aircraft and also the means for providing gas to constitute the jet of fluid ejected from the discharge outlet means.

11. An aircraft as claimed in claim 10, in which the power plant comprises a compressor-gas turbine engine, means being provided for ducting working fluid from the engine to the discharge outlet means to constitute the jet fluid.

References Cited in the file of this patent

UNITED STATES PATENTS

| | | |
|---|---|---|
| 1,580,577 | Baumann | Apr. 13, 1926 |
| 1,775,757 | Gay | Sept. 16, 1930 |
| 1,919,142 | Wetzel | July 18, 1933 |
| 2,376,834 | Thompson | May 22, 1945 |
| 2,479,487 | Goembel | Aug. 16, 1949 |
| 2,585,676 | Poisson-Quinton | Feb. 12, 1952 |
| 2,589,732 | Riviere | Mar. 18, 1952 |
| 2,885,160 | Griswold | May 9, 1959 |
| 2,941,751 | Gagarin | June 21, 1960 |

FOREIGN PATENTS

| | | |
|---|---|---|
| 214,904 | Australia | Feb. 13, 1958 |